(12) United States Patent
Ton (10) Patent No.: US 6,185,798 B1
(45) Date of Patent: Feb. 13, 2001

(54) SHOELACE FASTENER

(76) Inventor: Huy That Anh Ton, 1740 N. Lark, Wichita, KS (US) 67212

( * ) Notice: Under 35 U.S.C. 154(b), the term of this patent shall be extended for 0 days.

(21) Appl. No.: 09/347,301

(22) Filed: Jul. 6, 1999

(51) Int. Cl.[7] .................... A43C 7/08; F16G 11/00
(52) U.S. Cl. ............... 24/712.1; 24/115 G; 24/115 M; 24/136 R; 24/712.5
(58) Field of Search ................ 24/712.1, 712.5, 24/115 G, 115 M, 136 R (56) References Cited

U.S. PATENT DOCUMENTS

| Re. 31,052 | 10/1982 | Adams . | |
|---|---|---|---|
| 3,953,144 | 4/1976 | Boden . | |
| 3,965,544 | 6/1976 | Boden . | |
| 4,665,590 | * 5/1987 | Udelhofen et al. ................ | 24/712.5 |
| 4,680,835 | 7/1987 | Horng . | |
| 4,788,755 | * 12/1988 | Kasai ................................ | 24/712.5 |
| 4,878,269 | * 11/1989 | Anscher et al. .................. | 24/115 G |
| 5,477,593 | 12/1995 | Leick . | |
| 5,572,770 | 11/1996 | Boden . | |
| 5,894,639 | * 4/1999 | Boden et al. ..................... | 24/712.5 |

FOREIGN PATENT DOCUMENTS

| 0891065 | * 9/1953 | (DE) ................................. | 24/712.1 |
|---|---|---|---|

* cited by examiner

Primary Examiner—Victor N. Sakran (57) ABSTRACT

A device for releasably fastening two string portions together includes a hollow housing and a movable locking member disposed within the housing. The housing extends in a longitudinal direction and includes a midportion disposed between first and second longitudinal end portions. The openings for feeding the string portions into the housing are disposed on opposite lateral sides of the housing entirely within the midportion of the housing. In this way, when the device is used to fasten string portions in a movable environment (e.g. shoelaces), the tension force of the string portions in conjunction with the first and second longitudinal end portions of the device inhibit the device from "flip-flopping" or otherwise moving relative to its environment.

13 Claims, 7 Drawing Sheets

SHOELACE FASTENER

BACKGROUND OF THE INVENTION

1. Field of the Invention

The field of the invention pertains to devices for selectively fastening two string portions together which may be employed in place of tying a knot. More particularly, the field of the invention pertains to devices for selectively fastening two string portions together which can be advantageously employed in a movable environment.

2. Description of the Related Art

Devices for selectively fastening two string portions together are known e.g. from the following U.S. Patents, all of which are incorporated by reference herein: U.S. Pat. No. 5,572,770 to Boden; U.S. Pat. No. 5,477,593 to Leick; U.S. Pat. No. 4,680,835 to Horng; U.S. Pat. No. 3,965,544 to Boden; U.S. Pat. No. 3,953,144 to Boden; and Re. U.S. Pat. No. 31,052 to Adams. While these devices are suitable for their intended function, there is a possibility that some of these devices may be prone to "flip-flopping", or may be subject to other undesirable movements, when employed in a movable environment. This arises from the fact that the string portions often enter the devices at one longitudinal end portion of the device (see e.g. FIG.1 in U.S. Pat. No. 5,477,593). Under these circumstances, no significant forces (other than gravity and inertial forces) may exist which will inhibit the device from pivoting back-and-forth about the longitudinal end portion (i.e. "flip-flopping") when the device is subjected to external accelerations. Especially in the case where such a device is used with an athletic shoe, this may cause an inconvenience or an annoyance to the user.

SUMMARY OF THE INVENTION

It is an object of the invention to provide a device for selectively fastening two string portions together which is convenient to use and well-suited for use in movable environments (such as athletic wear, sporting goods and equipment, travel accessories, hand bags, carrying cases, etc.)

In one respect the invention relates to a device for releasably fastening two string portions together. The device includes a housing extending in a longitudinal direction which comprises a first longitudinal end portion, a second longitudinal end portion, and a midportion disposed between the first and second longitudinal end portions. A string holding cavity is formed within the housing, the string holding cavity being disposed between upper and lower housing walls and extending from an opening in the first longitudinal end portion of the housing to the midportion of the housing, the string holding cavity being configured such that the transverse width of the cavity decreases as the cavity extends to (or in the direction to) the midportion of the housing, and the string holding cavity defining a jamming zone, of decreased transverse width, adjacent the midportion of the housing. The jamming zone is delimited by converging inner housing sections, and an interconnection zone is formed in the housing for interconnecting the jamming zone of the string holding cavity with a control button guide channel formed in the housing. The control button guide channel extends from the midportion of the housing toward the second longitudinal end portion of the housing and is configured so as to interconnect the string holding cavity with a longitudinal opening in the upper housing wall. Additionally, a first string feeding passage is formed in housing, the first string feeding passage extending from a first string feeding opening in a first lateral side of the housing to the interconnection zone, and a second string feeding passage is formed in the housing, the second string feeding passage extending from a second string feeding opening in a second lateral side of the housing to the interconnection zone. The device further includes a movable locking member which is disposed within the housing, the locking member comprising a) a control button, b) a jamming device, and c) a connecting portion for interconnecting the control button and the jamming device. The control button is partly received within the control button guide channel and partly extends through the longitudinal opening in the upper housing wall so as to be both accessible from outside the housing and movable within the guide channel. The jamming device is disposed within the string holding cavity and includes wedge means, having a transverse width substantially corresponding to or larger than the decreased transverse width of the jamming zone of the string holding cavity, for selectively reacting against the converging inner housing sections that delimit the jamming zone of the string holding cavity. In this respect, the first and second string feeding openings are each formed in the midportion of the housing, wherein the housing is characterized by a longitudinal length L, and wherein each of the first and second longitudinal end portions occupy at least 25% of longitudinal length L of the housing.

In another respect, the invention relates to a device for releasably fastening two string portions together. The device includes a housing extending in a longitudinal direction which comprises a first longitudinal end portion, a second longitudinal end portion, and a midportion disposed between the first and second longitudinal end portions. A string holding cavity is formed within the housing, the string holding cavity being disposed between upper and lower housing walls and extending from an opening in the first longitudinal end portion of the housing to the midportion of the housing, the string holding cavity being configured such that the transverse width of the cavity decreases as the cavity extends to (or in the direction to) the midportion of the housing, and the string holding cavity defining a jamming zone, of decreased transverse width, adjacent the midportion of the housing. The jamming zone is delimited by converging inner housing sections, and an interconnection zone is formed in the housing for interconnecting the jamming zone of the string holding cavity with a control button guide channel formed in the housing. The control button guide channel extends from the midportion of the housing toward the second longitudinal end portion of the housing and is configured so as to interconnect the string holding cavity with a longitudinal opening in the upper housing wall. Additionally, a first string feeding passage is formed in housing, the first string feeding passage extending from a first string feeding opening in a first lateral side of the housing to the interconnection zone, and a second string feeding passage is formed in the housing, the second string feeding passage extending from a second string feeding opening in a second lateral side of the housing to the interconnection zone. The device further includes a movable locking member which is disposed within the housing, the locking member comprising a) a control button, b) a jamming device, and c) a connecting portion for interconnecting the control button and the jamming device. The control button is partly received within the control button guide channel and partly extends through the longitudinal opening in the upper housing wall so as to be both accessible from outside the housing and movable within the guide channel. The jamming device is disposed within the string holding cavity and includes wedge means, having a transverse width substantially corresponding to or larger than the decreased transverse width of the jamming zone of the string holding cavity, for selectively reacting against the converging inner housing sections that delimit the jamming zone of the string holding cavity. In this respect, the first string feeding opening is closed-form in shape, the second string feeding opening is closed form in shape, and the first string feeding opening is distinct from the second string feeding opening.

In yet another respect, the invention relates to a device for releasably fastening two string portions together. The device includes a housing extending in a longitudinal direction which comprises a first longitudinal end portion, a second longitudinal end portion, and a midportion disposed between the first and second longitudinal end portions. A string holding cavity is formed within the housing, the string holding cavity being disposed between upper and lower housing walls and extending from an opening in the first longitudinal end portion of the housing to the midportion of the housing, the string holding cavity being configured such that the transverse width of the cavity decreases as the cavity extends to (or in the direction to) the midportion of the housing, and the string holding cavity defining a jamming zone, of decreased transverse width, adjacent the midportion of the housing. The jamming zone is delimited by converging inner housing sections, and an interconnection zone is formed in the housing for interconnecting the jamming zone of the string holding cavity with a control button guide channel formed in the housing. The control button guide channel extends from the midportion of the housing toward the second longitudinal end portion of the housing and is configured so as to interconnect the string holding cavity with a longitudinal opening in the upper housing wall. Additionally, a first string feeding passage is formed in housing, the first string feeding passage extending from a first string feeding opening in a first lateral side of the housing to the interconnection zone, and a second string feeding passage is formed in the housing, the second string feeding passage extending from a second string feeding opening in a second lateral side of the housing to the interconnection zone. The device further includes a movable locking member which is disposed within the housing, the locking member comprising a) a control button, b) a jamming device, and c) a connecting portion for interconnecting the control button and the jamming device. The control button is partly received within the control button guide channel and partly extends through the longitudinal opening in the upper housing wall so as to be both accessible from outside the housing and movable within the guide channel. The jamming device is disposed within the string holding cavity and includes wedge means, having a transverse width substantially corresponding to or larger than the decreased transverse width of the jamming zone of the string holding cavity, for selectively reacting against the converging inner housing sections that delimit the jamming zone of the string holding cavity. In this respect, the longitudinal length of the housing is between approximately 1.0 and 2.5 inches, wherein the first and second string feeding openings are each formed in the midportion of the housing, and wherein the housing extends at least approximately 0.5 inches in both longitudinal directions from each of the first and second string feeding openings.

The invention will, however, be best understood by a review of the following detailed description in conjunction with the accompanying drawings in which:

DETAILED DESCRIPTION OF THE PREFERRED EMBODIMENT

Referring now to the drawings in which like reference numerals and characters indicate like elements throughout, there in shown in FIGS. 1 to 11 a shoelace fastener F according to a first embodiment of the invention which receives, holds, and selectively locks (e.g. fastens together) a pair of string portions 3a, 3b of a shoelace 3.

Figure 3:
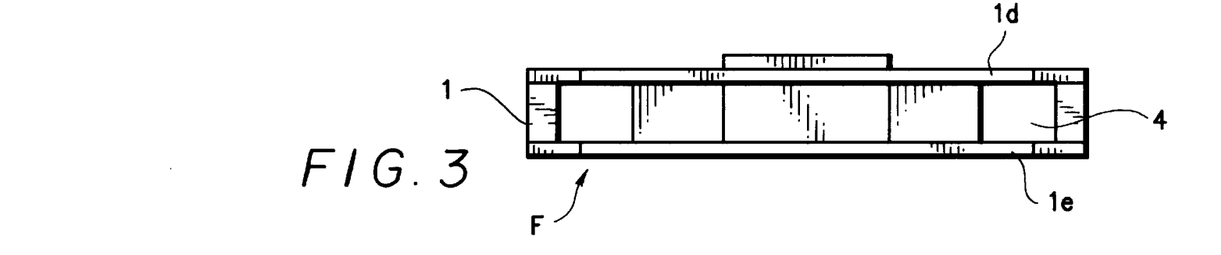
FIG. 3 is a side view of the device of FIG. 1, looking into the first longitudinal end portion of the device.
Figure 4:
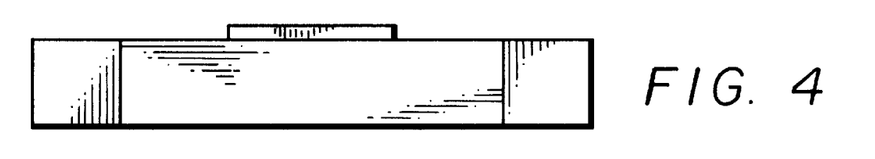
FIG. 4 is another side view of the device of FIG. 1, looking at the second longitudinal end portion of the device.
Figures 5, 6:
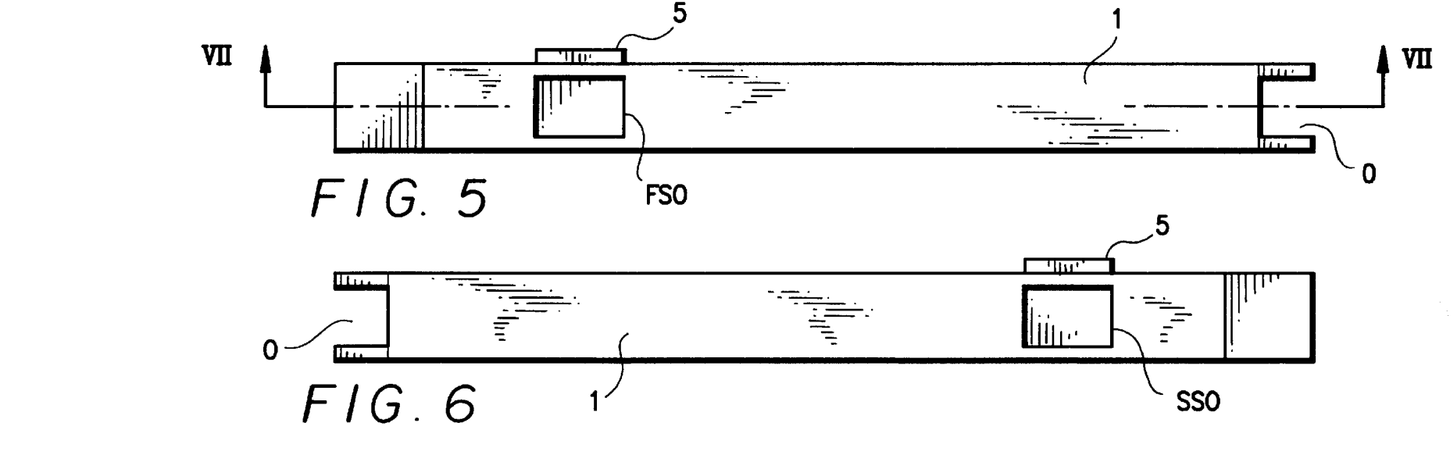
FIG. 5 is yet another side view of the device of FIG. 1, looking at the first lateral side of the device.
FIG. 6 is still another side view of the device of FIG. 1, looking at the second lateral side of the device.
Figure 7:
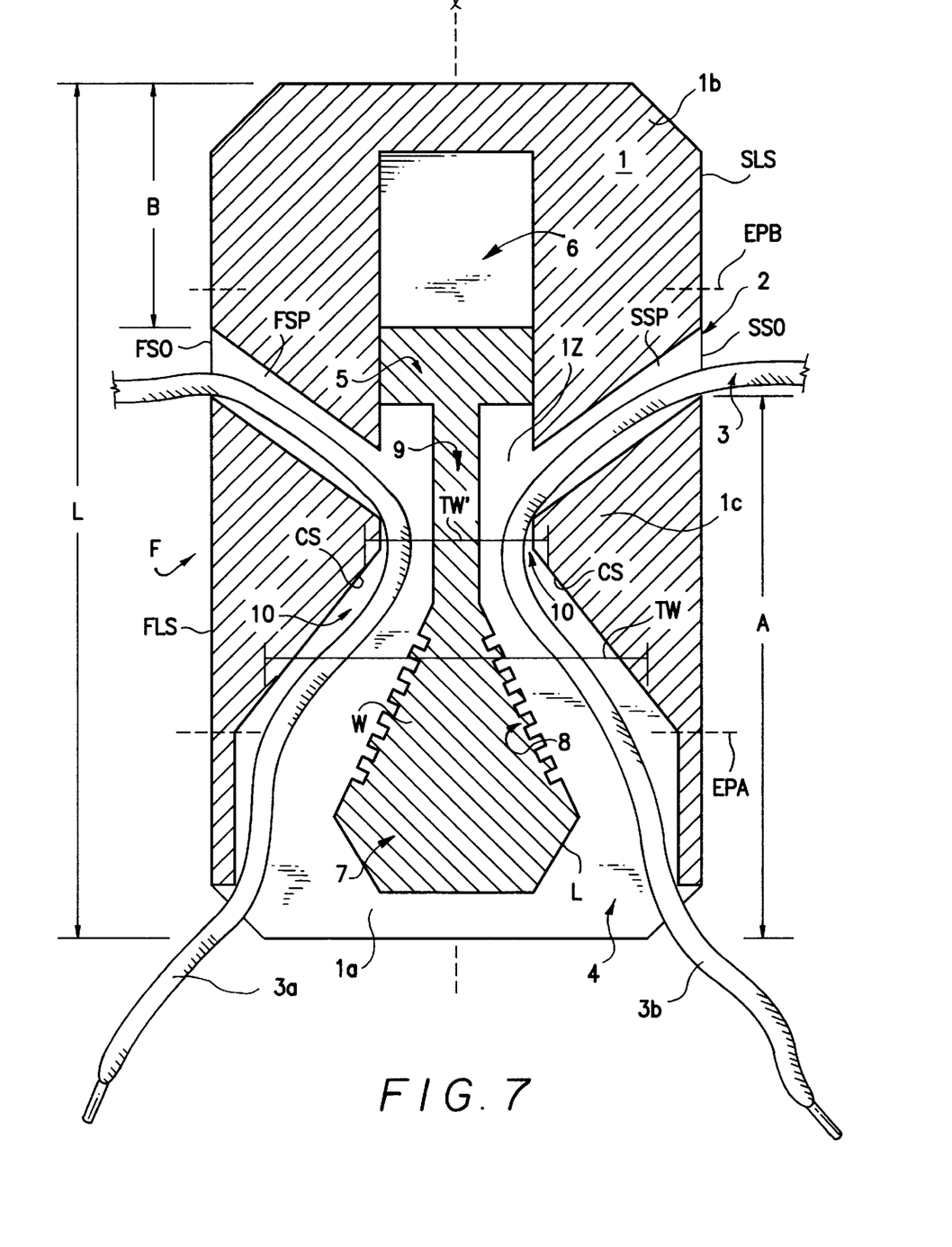
FIG. 7 is a longitudinal cross-sectional view of the device of FIG. 1, taken along lines VII—VII in FIG. 5, while the device is in a "released" position.

As shown more particularly in FIG. 7, the fastener F includes a housing 1 (made from plastic or other suitable light-weight and strong structural materials) having a length L of between 1.0 and 2.5 inches (and preferably between 1.0 and 2.0 inches) as defined in a longitudinal direction of the fastener, the longitudinal direction being indicated by the arrow(s) in FIG. 7. The housing is formed symmetrically about a longitudinal axis l and comprises a first longitudinal end portion 1a, a second longitudinal end portion 1b, and a midportion 1c disposed between the first and second longitudinal end portions 1a, 1c. As shown in FIGS. 3, 5, and 7, a string holding cavity 4 is formed within the housing 1, the string holding cavity 4 being disposed between upper and lower housing walls 1d and 1e (respectively) and extending from an opening O in the first longitudinal end portion 1a of the housing 1 to the midportion 1c of the housing 1. As shown in FIG. 7, the string holding cavity 4 is configured such that the transverse width TW of the cavity 4 decreases as the cavity 4 extends to (or in the direction toward) the midportion 1c of the housing 1, and the string holding cavity 4 defines a jamming zone (or zones) 10 of decreasing (or decreased) transverse width TW' adjacent the midportion 1c of the housing 1. The jamming zone 10 is delimited by converging inner housing sections CS (which are formed in the midportion 1c of the housing, as shown in FIG. 7), and an interconnection zone IZ is formed in the housing for interconnecting the jamming zone 10 of the string holding cavity 4 with a control button guide channel 6 formed in the housing 1. The control button guide channel 6 extends from the midportion 1c of the housing 1 toward the second longitudinal end portion 1b of the housing 1 and is configured so as to interconnect (via the intermediate zone IZ) the string holding cavity 4 with a longitudinal opening LO in the upper housing wall 1d (see FIGS. 9 to 11). (The longitudinal opening LO in the upper housing wall ld extends from the midportion 1c of the housing 1 to the second longitudinal end 1b of the housing 1.) Additionally, a first string feeding passage FSP is formed in housing 1, the first string feeding passage FSP extending from a first string feeding opening FSO in a first lateral side FLS of the housing 1 to the interconnection zone IZ, and a second string feeding passage SSP is also formed in the housing 1, the second string feeding passage SSP extending from a second string feeding opening SSO in a second lateral side SLS of the housing 1 to the interconnection zone IZ. The device further includes a movable locking member L (made from plastic or other suitable light-weight and strong structural materials) which is disposed within the housing, the locking member comprising a) a control button 5, b) a jamming device 7, and c) a connecting portion 9 for interconnecting the control button 5 and the jamming device 7. The control button 5 is partly received within the control button guide channel 6 (see e.g. FIG. 7) and partly extends through the longitudinal opening LO in the upper housing wall 1d (see FIGS. 5, 6, and 9) so as to be both accessible from outside the housing 1 and movable within the guide channel 6. The jamming device 7 is disposed within the string holding cavity 4 and includes a wedge section W (in the form of a substantially triangular section), having a transverse width substantially corresponding to or larger than the decreased transverse width TW' of the jamming zone 8 of the string holding cavity 4, for selectively reacting against the converging inner housing sections CS that delimit the jamming zone 10 of the string holding cavity 4. (By "substantially corresponding to", it is meant that the transverse width of the wedge section can be equal to or even slightly smaller than the minimum decreased transverse width TW' of the jamming zone 8, as long as the "gaps" which are left between the wedge section and the adjacent portions of the converging inner housing sections CS when the movable locking member L is in its full locked position are each significantly smaller than the diameter or cross-section of the string portions 3a, 3b to be secured in the fastener F.) The wedge section W includes friction-increasing or grip-increasing teeth 8 which are adapted to selectively engage the two string portions 3a, 3b when the movable locking member L is in its locked position. The connecting portion is disposed at least partly within the interconnection zone of the housing (cf. FIG. 7) when the movable locking member L is in its released position.

As shown in FIG. 7, the first and second string feeding openings FSO, SSO are each formed entirely in the midportion 1c of the housing 1, and when the housing is characterized by a longitudinal length L and when the (e.g. imaginary) boundaries between the midportion 1c and the first and second longitudinal end portions 1a, 1b are denoted by EPA and EPB, then each of the first and second longitudinal end portions occupy at least 25% of longitudinal length L of the housing. For example, in the case when the longitudinal length of the fastener F is 1.6 inches, then each of the first and second end portions 1a, 1b may be at least 0.4 inches in length. As shown in the preferred embodiment of FIG. 7, the housing extends by a length "A" from each of the first and second string openings FSO, SSO in the direction toward the first longitudinal end portion 1a of the fastener F, and by a length "B" from each of the first and second string openings FSO, SSO in the direction toward the second longitudinal end portion 1b of the fastener F. The lengths "A" and "B" are preferably equal to 0.5 inches or more. In the case when the longitudinal length of the fastener F is 1.6 inches, then the length "A" may be almost 1 inch and the length "B" may be approximately 0.5 inches.

As shown in FIGS. 5, 6, and 9 to 11, according to the preferred embodiment of the invention, the first and second string feeding openings FSO, SSO are preferably closed-form (e.g. rectangular) in shape. (By "closed-form", it is meant that each of the openings is defined by a closed-line figure, such as a rectangle, square, circle, oval, polygon, etc., in which the two imaginary ends of the figure line meet each other, rather than by an open-figure, such as a U-shaped or V-shaped slot, having two line ends which do not meet. The closed-line figure which defines each of the first and second string feeding openings FSO, SSO also preferably corresponds to the cross-sectional shape of the respective string feeding passages FSP, SSP.) Moreover, the first string feeding opening FSO is symmetrically arranged (e.g. about the axis l) with respect to the second string feeding opening SSO, and it is also distinct from the second string feeding opening SSO.

Figure 1:
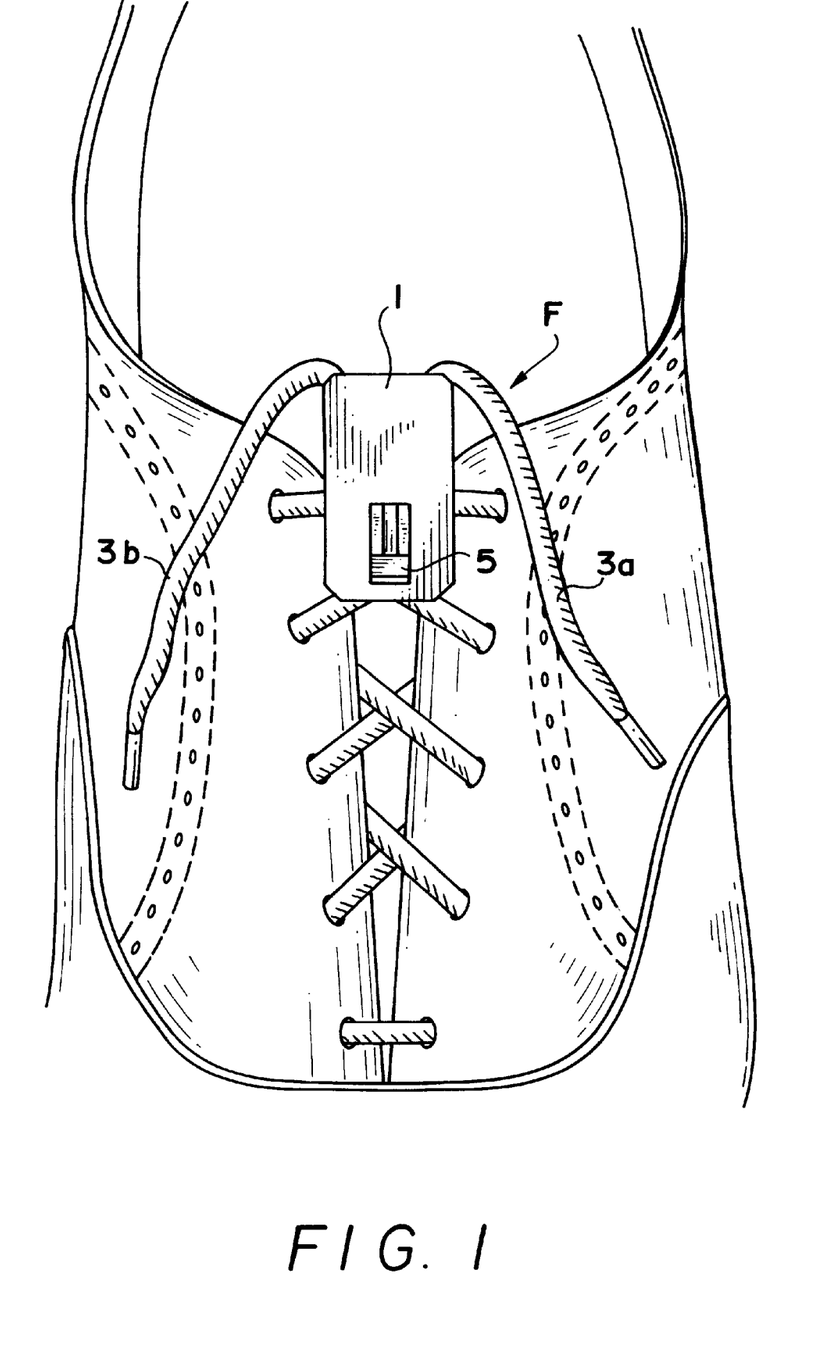
FIG. 1 is a top perspective view of an athletic shoe or sneaker having a string fastening device according to one embodiment of the invention secured thereto.
Figure 2:
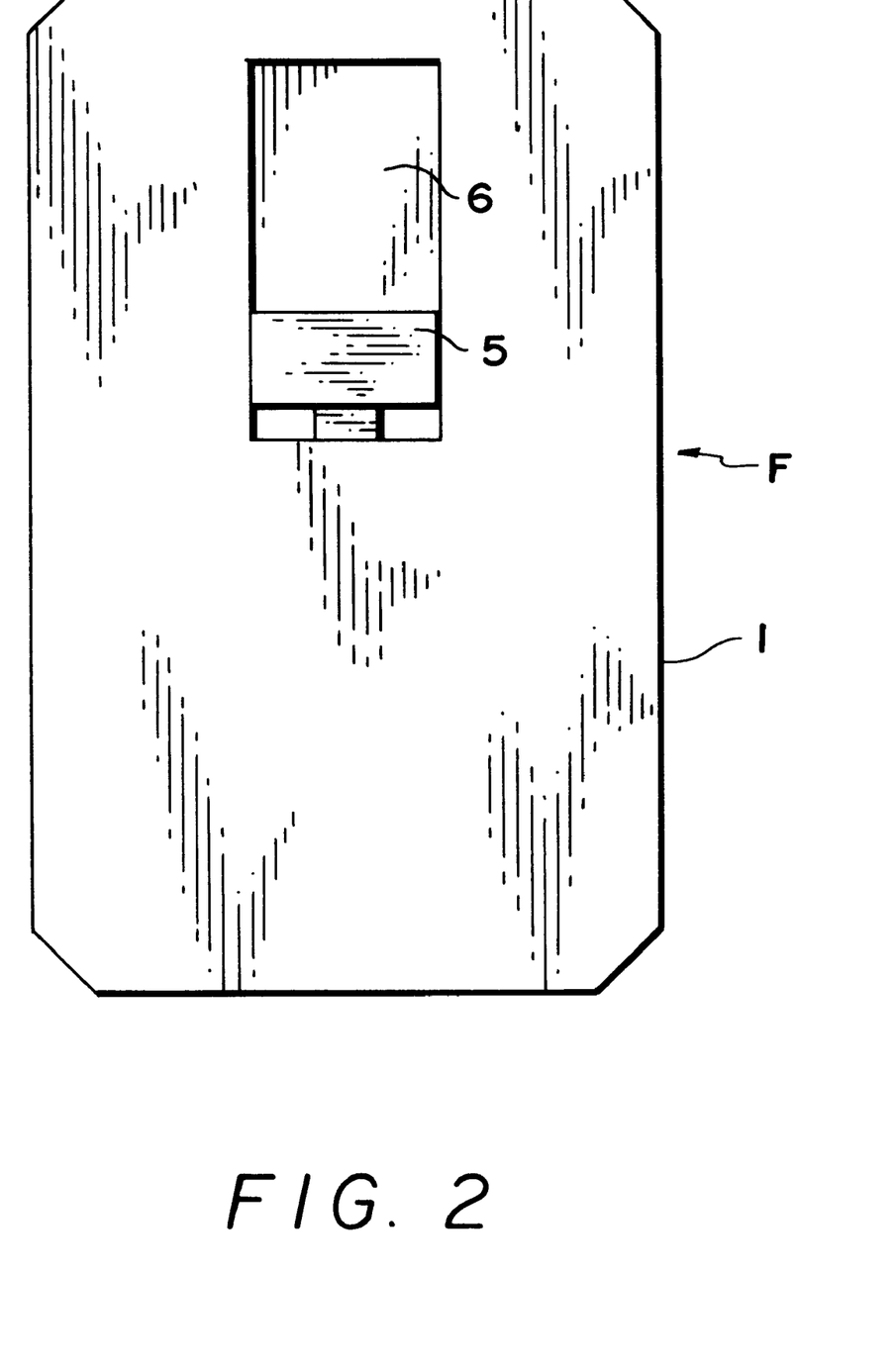
FIG. 2 is a top perspective view of the device of FIG. 1, looking down from the point-of-view of the wearer of the athletic shoe shown in FIG. 1.
Figure 8:
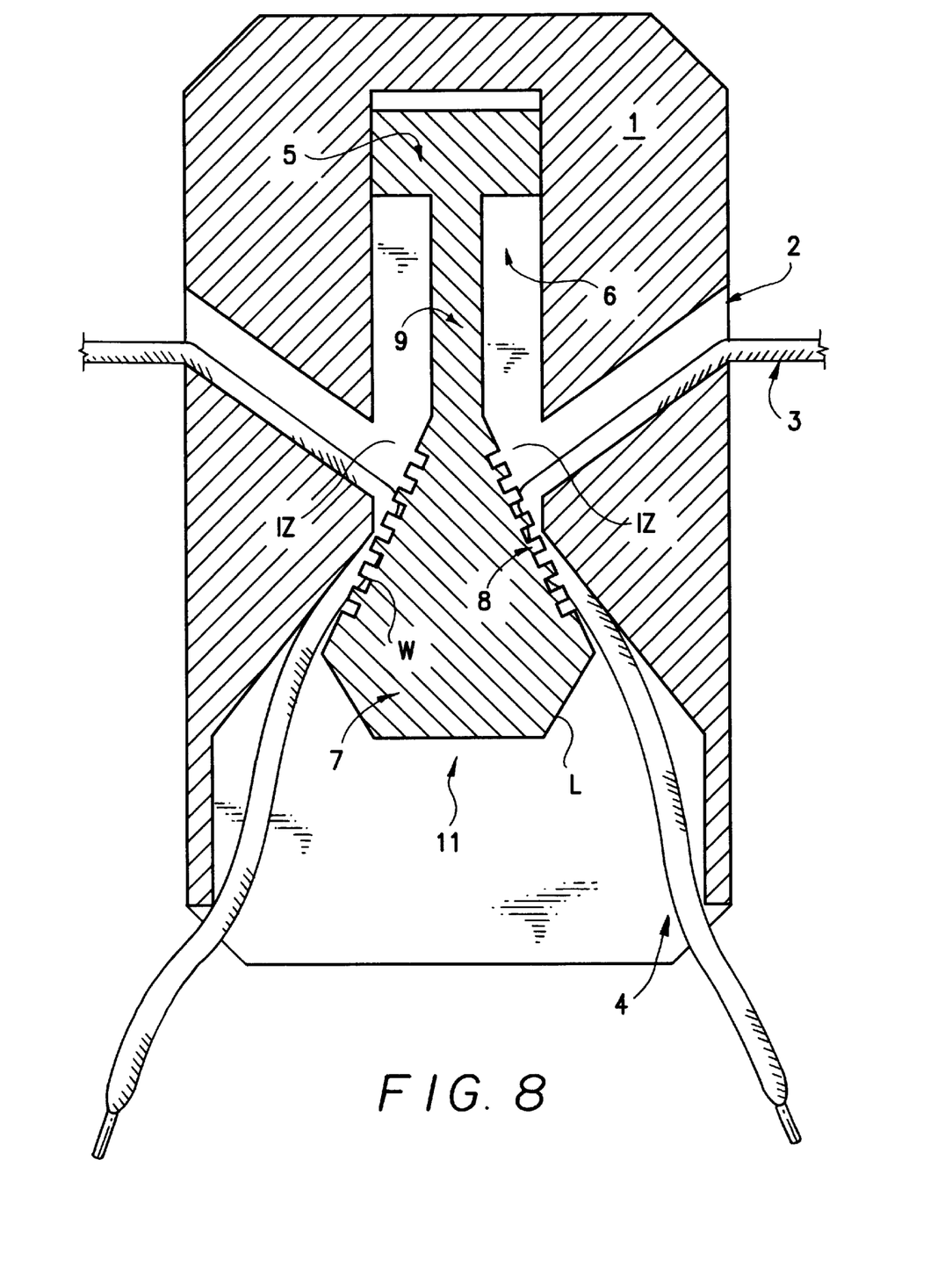
FIG. 8 is a longitudinal cross-sectional view of the device of FIG. 1, taken while the device is in a "locked" position.
Figure 9:
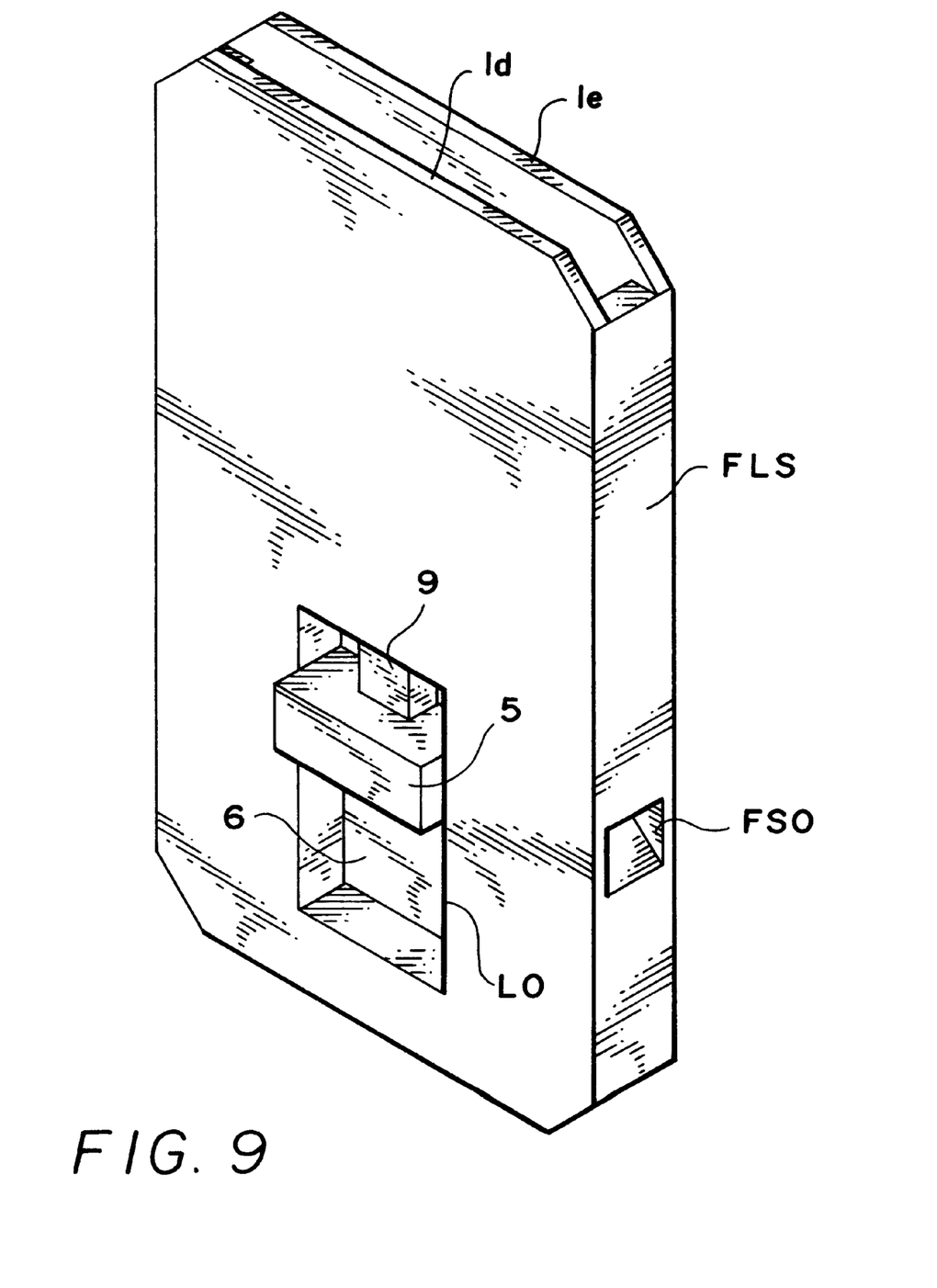
FIGS. 9, 10, and 11 are various top perspective views of the device.
Figure 10:
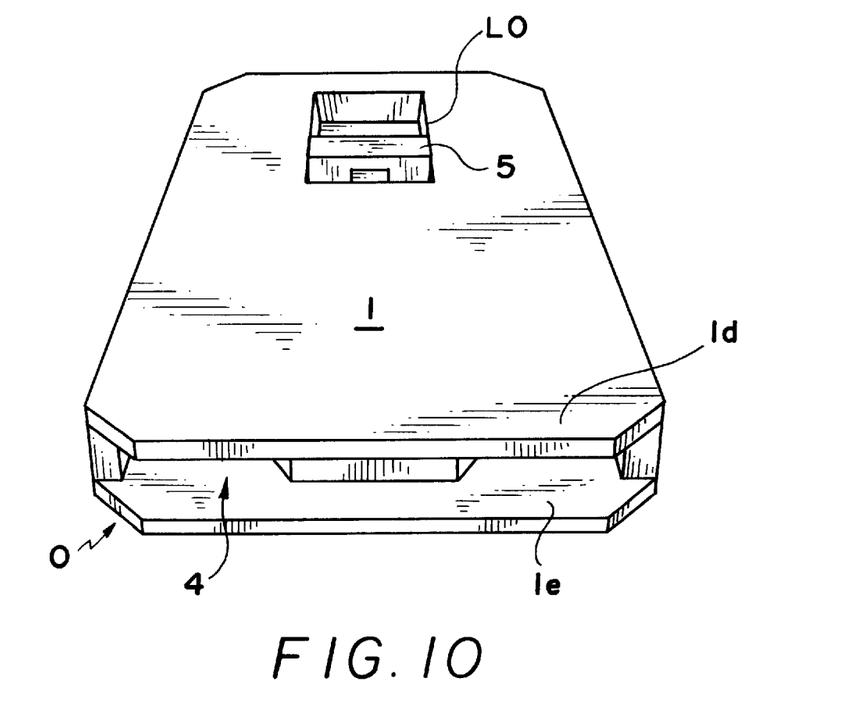
Figure 11:
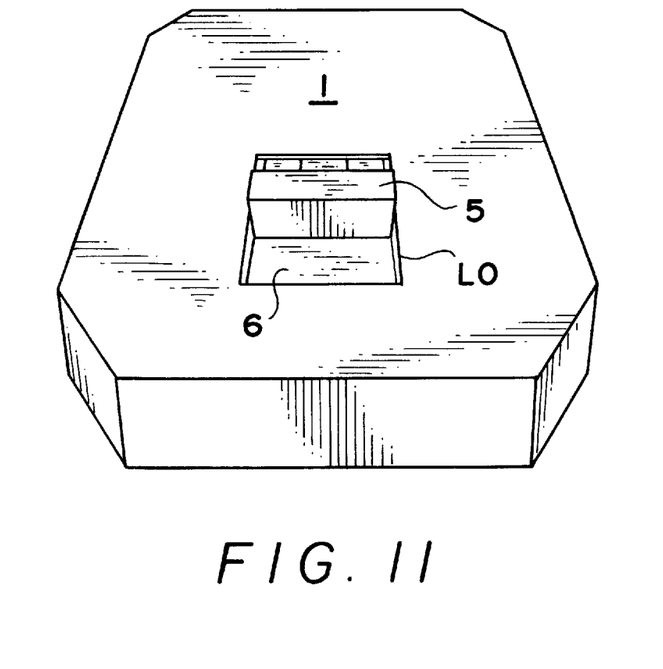

In use, when the two string portions 3a, 3b are received by the first and second string feeding passages FSP, SSP and passed through the string holding cavity 4 (as shown in FIGS. 1 and 7) and the manual control button 5 is moved upwardly (i.e. towards the second end portion 1b of the housing 1) by hand manipulation to its locked position (i.e. as shown in FIG. 8), the wedge section W is caused to indirectly react against the converging inner housing sections CS through the intermediary of the two string portions 3a, 3b to thereby create friction and fasten the two string portions 3a, 3b to the housing, and indirectly, to each other. (The converging angle of the converging inner housing sections CS is preferably selected so that once the string portions 3a, 3b are fastened, the friction itself will maintain the wedge section W in its locked position until the control button is manually moved to its released position.) To release the fastener, the control button 5 is moved in the opposite direction (i.e. toward the first end portion 1a of the housing 1) so that a clearance space is established between the wedge section W and the converging inner housing sections CS which permits relatively free forwards or backwards movement of the string portions 3a, 3b e.g. within their respective string feeding passages FSP, SSP.

It will be seen therfore that because the string feeding openings SFO, SSO are disposed at the sides of the housing 1 in the midportion 1c thereof, the tension force of the string portions 3a, 3b in conjunction with the first and second longitudinal end portions 1a, 1b of the housing 1 (which normally react against the device on which the fastener is employed) will inhibit the fastener F from "flip-flopping" or otherwise moving relative to its environment, even when the device is used in a movable environment such as an athletic shoe.

To assemble the fastener, a movable locking member L made from two pieces which are glued together may be employed. Specifically, after the housing 1 has been molded through suitable and known techniques, a first part of the movable locking member L (comprising the jamming device 7 and the connecting portion 9) is inserted through the opening O and into the string holding cavity 4. Therafter, a second part of the movable locking member L (comprising the control button 5) is inserted through the longitudinal opening LO in the upper housing wall 1d. Then, the two parts of the movable locking member are glued, fastened, or otherwise secured together through suitable and known techniques.

The terms "longitudinal" and "transverse", as used herein, describe relative directions only, and the "longitudinal" direction of the fastener need not correspond to the longest dimension of the fastener (i.e. the width of the fastener may be larger than the longitudinal length L of the fastener).

While the invention has been described with certain particularity, it is not meant to be limited to the above described preferred embodiment. For example, the wedge section W may be substantially circular or oval in shape rather than triangular. Therefore, the present invention will include the disclosed embodiment and any modifications thereof which will fall within the scope of the appended claims.

I claim:

1. A device for releasably fastening two string portions together, comprising:

a housing extending in a longitudinal direction and including a first longitudinal end portion, a second longitudinal end portion, and a midportion disposed between the first and second longitudinal end portions, wherein a string holding cavity is formed within the housing, the string holding cavity being disposed between upper and lower housing walls and extending from an opening in the first longitudinal end portion of the housing to the midportion of the housing, the string holding cavity being configured such that the transverse width of the cavity decreases as the cavity extends from the first longitudinal end portion of the housing to the midportion of the housing, and the string holding cavity defining a jamming zone, of decreased transverse width, the jamming zone being delimited by converging inner housing sections which are disposed in the midportion of the housing, wherein an interconnection zone is formed in the housing for interconnecting the jamming zone of the string holding cavity with a control button guide channel formed in the housing, the control button guide channel extending from the midportion of the housing toward the second longitudinal end portion of the housing and being configured so as to interconnect the string holding cavity with a longitudinal opening in the upper housing wall, wherein a first string feeding passage is formed in housing, the first string feeding passage extending from a first string feeding opening in a first lateral side of the housing to the interconnection zone, wherein a second string feeding passage is formed in the housing, the second string feeding passage extending from a second string feeding opening in a second lateral side of the housing to the interconnection zone, wherein the first and second string feeding openings are each formed entirely in the midportion of the housing; and a movable locking member disposed within the housing, wherein the locking member includes a) a control button, b) a jamming device, and c) a connecting portion for interconnecting the control button and the jamming device, wherein the control button is partly received within the control button guide channel and partly extends through the longitudinal opening in the upper housing wall so as to be both accessible from outside the housing for hand manipulation and movable within the guide channel, wherein the jamming device is disposed within the string holding cavity and includes wedge means, having a transverse width substantially corresponding to or larger than the decreased transverse width of the jamming zone of the string holding cavity, for reacting against the converging inner housing sections that delimit the jamming zone of the string holding cavity when the control button is moved, by hand manipulation during use of the device, in a direction toward the second longitudinal end portion of the housing, wherein, when the control button is moved, by hand manipulation during use of the device, in a direction toward the first longitudinal end portion of the housing, a clearance space is established between the wedge means and the converging inner housing sections, and:

wherein the first and second string feeding openings are each formed in the midportion of the housing, wherein the housing is characterized by a longitudinal length L, and wherein each of the first and second longitudinal end portions occupy at least 25% of longitudinal length L of the housing, whereby the device can be inhibited from flip-flopping relative to its environment when the two string portions are received by the first and second string feeding passages, respectively, and passed through the string holding cavity.

2. The device as recited in claim 1, wherein the first and second string feeding openings are each closed-form in shape.

3. The device as recited in claim 1, wherein the longitudinal length of the housing is between approximately 1.0 and 2.5 inches.

4. The device as recited in claim 3, wherein the longitudinal length of the housing is between substantially 1.0 and 2.0 inches.

5. The device according to claim 1, wherein, when the two string portions are received by the first and second string feeding passages and passed through the string holding cavity, the wedge means is effective to indirectly react against the converging inner housing sections through the intermediary of the two string portions to thereby create friction and fasten the two string portions to the housing, and indirectly, to each other when the control button is moved, by hand manipulation during use of the device, in the direction toward the second longitudinal end portion of the housing; and when the control button is moved, by h and manipulation during use of the device, in the direction toward the first longitudinal end portion of the housing, the clearance space which is established between the wedge means and the converging inner housing sections is sufficient to permit relatively free forwards and backwards movements of the two string portions within the first and second string feeding passages.

6. The device as recited in claim 5, wherein the wedge means includes teeth which are adapted to engage the two string portions.

7. The device as recited in claim 6, wherein the jamming device is generally triangular in shape.

8. A device for releasably fastening two string portions together, comprising:

a housing extending in a longitudinal direction and including a first longitudinal end portion, a second longitudinal end portion, and a midportion disposed between the first and second longitudinal end portions, wherein a string holding cavity is formed within the housing, the string holding cavity being disposed between upper and lower housing walls and extending from an opening in the first longitudinal end portion of the housing to the midportion of the housing, the string holding cavity being configured such that the transverse width of the cavity decreases as the cavity extends from the first longitudinal end portion of the housing to the midportion of the housing, and the string holding cavity defining a jamming zone, of decreased transverse width, the jamming zone being delimited by converging inner housing sections which are disposed in the midportion of the housing, wherein an interconnection zone is formed in the housing for interconnecting the jamming zone of the string holding cavity with a control button guide channel formed in the housing, the control button guide channel extending from the midportion of the housing toward the second longitudinal end portion of the housing and being configured so as to interconnect the string holding cavity with a longitudinal opening in the upper housing wall, wherein a first string feeding passage is formed in housing, the first string feeding passage extending from a first string feeding opening in a first lateral side of the housing to the interconnection zone, wherein a second string feeding passage is formed in the housing, the second string feeding passage extending from a second string feeding opening in a second lateral side of the housing to the interconnection zone; and a movable locking member disposed within the housing, wherein the locking member includes a) a control button, b) a jamming device, and c) a connecting portion for interconnecting the control button and the jamming device, wherein the control button is partly received within the control button guide channel and partly extends through the longitudinal opening in the upper housing wall so as to be both accessible from outside the housing and movable within the guide channel, wherein the jamming device is disposed within the string holding cavity and includes wedge means, having a transverse width substantially corresponding to or larger than the decreased transverse width of the jamming zone of the string holding cavity, for selectively reacting against the converging inner housing sections that delimit the jamming zone of the string holding cavity, and:

wherein the first string feeding opening is closed-form in shape, wherein the second string feeding opening is closed form in shape, and wherein the first string feeding opening is distinct from the second string feeding opening, whereby the device can be inhibited from flip-flopping relative to its environment when the two string portions are received by the first and second string feeding passages, respectively, and passed through the string holding cavity.

9. The device according to claim 8, wherein, when the two string portions are adapted to be received by the first and second string feeding passages and passed through the string holding cavity, the wedge means is adapted to indirectly react against the converging inner housing sections through the intermediary of the two string portions to thereby create friction and fasten the two string portions to the housing, and indirectly, to each other.

10. The device as recited in claim 8, wherein the first and second string feeding openings are each formed entirely in the midportion of the housing.

11. A device for releasably fastening two string portions together, comprising:

a housing extending in a longitudinal direction and including a first longitudinal end portion, a second longitudinal end portion, and a midportion disposed between the first and second longitudinal end portions, wherein a string holding cavity is formed within the housing, the string holding cavity being disposed between upper and lower housing walls and extending from an opening in the first longitudinal end portion of the housing to the midportion of the housing, the string holding cavity being configured such that the transverse width of the cavity decreases as the cavity extends from the first longitudinal end portion of the housing to the midportion of the housing, and the string holding cavity defining a jamming zone, of decreased transverse width, the jamming zone being delimited by converging inner housing sections which are disposed in the midportion of the housing, wherein an interconnection zone is formed in the housing for interconnecting the jamming zone of the string holding cavity with a control button guide channel formed in the housing, the control button guide channel extending from the midportion of the housing toward the second longitudinal end portion of the housing and being configured so as to interconnect the string holding cavity with a longitudinal opening in the upper housing wall, wherein a first string feeding passage is formed in housing, the first string feeding passage extending from a first closed-form string feeding opening in a first lateral side of the housing to the interconnection zone, wherein a second string feeding passage is formed in the housing, the second string feeding passage extending from a second closed-form string feeding opening in a second lateral side of the housing to the interconnection zone; and a movable locking member disposed within the housing, wherein the locking member includes a) a control button, b) a jamming device, and c) a connecting portion for interconnecting the control button and the jamming device, wherein the control button is partly received within the control button guide channel and partly extends through the longitudinal opening in the upper housing wall so as to be both accessible from outside the housing for hand manipulation and movable within the guide channel, wherein the jamming device is disposed within the string holding cavity and includes wedge means, having a transverse width substantially corresponding to or larger than the decreased transverse width of the jamming zone of the string holding cavity, for selectively reacting against the converging inner housing sections that delimit the jamming zone of the string holding cavity, and:

wherein the longitudinal length of the housing is between 1.0 and 2.5 inches, wherein the first and second string feeding openings are each formed entirely in the midportion of the housing, and wherein the housing extends at least approximately 0.5 inches in both longitudinal directions from each of the first and second closed-form string feeding openings.

12. The device according to claim 11, wherein the longitudinal length of the housing is between 1.0 and 2.0 inches.

13. The device according to claim 11, wherein, when the two string portions are adapted to be received by the first and second string feeding passages and passed through the string holding cavity, the wedge means is adapted to indirectly react against the converging inner housing sections through the intermediary of the two string portions to thereby create friction and fasten the two string portions to the housing, and indirectly, to each other.

* * * * *